TWO-INPUT BISTABLE LOGIC CIRCUIT OF THE DELAY FLIP-FLOP TYPE
Filed July 11, 1966
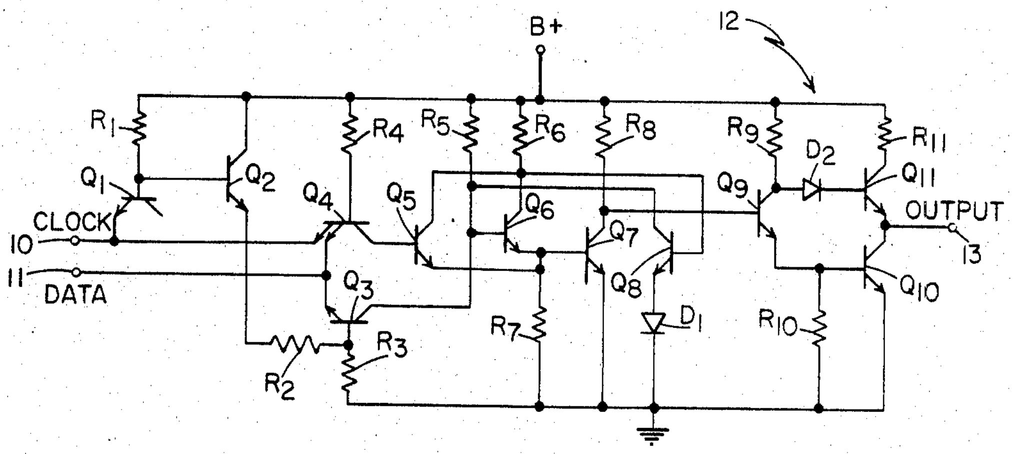
INVENTOR.
JOHN J. KARDASH
BY
David M. Keay
AGENT.

United States Patent Office 3,473,053
Patented Oct. 14, 1969

3,473,053

TWO-INPUT BISTABLE LOGIC CIRCUIT OF THE DELAY FLIP-FLOP TYPE

John J. Kardash, South Acton, Mass., assignor to Sylvania Electric Products Inc., a corporation of Delaware Filed July 11, 1966, Ser. No. 564,099
Int. Cl. H03k 3/286
U.S. Cl. 307—291 7 Claims

ABSTRACT OF THE DISCLOSURE

Two-input bistable circuit including a first flip-flop element of two transistors and a second flip-flop element of one transistor. The flip-flop elements are cross-coupled by feedback connections so as to operate in opposite conduction conditions. Clock and data input terminals are connected to a first input transistor which is connected to a first switching transistor, and the first switching transistor is connected to one of the transistors of the first flip-flop element and to one of the feedback connections whereby the presence of an information signal at the data input terminal during a clock pulse causes the flip-flop elements to operate in one set of conduction conditions. The clock and data input terminals are also connected through a second input arrangement to a second switching transistor, and the second switching transistor is connected to the other transistor of the first flip-flop element whereby the absence of an information signal at the data input terminal during a clock pulse causes the flip-flop elements to operate in a second set of conduction conditions.

This invention relates to bistable logic circuits. More particularly, it is concerned with flip-flop circuits of the type wherein data information which determines the operating state of the flip-flop circuit is entered into the circuit only during a gating or clock pulse.

Two-input bistable circuits which are employed as binary registers to hold a single bit of information are widely used in synchronous computers. One type of circuit is set to one operating state by the occurrence of input signals at both inputs simultaneously and is set to the other state by the presence of a signal at a particular one of the inputs while there is no signal present at the other input.

A bistable circuit of this type is the so-called delay flip-flop or delay memory element which has a single data input and an output equal to the input one bit-time earlier. Data information is applied at the data input and periodic clock pulses are applied at another input. If during the occurrence of a clock pulse a data signal is present at the data input, the flip-flop is set to one operating state, and if during the occurrence of the clock pulse there is no data signal present at the data input, the flip-flop is set to the other operating state. Thus, in effect, the information bit at the data input is delayed from entering the flip-flop and being available at its output until the occurrence of the clock pulse. Bistable circuits of this type are employed as binary registers for use in temporary storage, or so-called "scratch pad," memory systems and as registers for assembling and transferring data.

Bistable circuits of the foregoing type may be formed by arrangement of flip-flop circuits and suitable input gates to provide the appropriate logic operations. Monolithic integrated circuit networks each of which performs a basic logic function are available as compatible individual units which may be appropriately connected to provide the logic functions of a delay flip-flop. For each bit of a multiple-bit register several individual units or logic blocks are required.

Larger aggregations of components in a single chip of semiconductor material to provide monolithic integrated circuit networks performing more complicated logic functions have become possible as the art of fabricating monolithic integrated circuit networks has advanced. However, the fabrication of a delay flip-flop in accordance with known techniques of interconnecting compatible logic blocks would require a large number of active and passive components. Thus, several delay flip-flops constituting a multiple-bit register would consume a great deal of space in a semiconductor chip and introduce serious problems of electrical interconnections and power dissipation. In addition, delay flip-flops formed by combining known types of logic gates and flips-flops are limited in the speed with which signals are propagated through the circuit and presented at the output.

It is an object of the present invention, therefore, to provide an improved bistable logic circuit.

It is also an object of the invention to provide a simplified, high speed, delay type flip-flop circuit.

It is another object of the invention to provide a simplified bistable logic circuit amenable to fabrication in multiple within a single chip of semiconductor material to form a single chip multiple-bit binary register.

Briefly, in accordance with the foregoing objects a bistable circuit according to the invention includes a first flip-flop element and a second flip-flop element each having a first operating condition and a second operating condition. A first feedback connection from the first flip-flop element to the second flip-flop element tends to bias the second flip-flop element to the operating condition different from the operating condition of the first flip-flop element, and a second feedback connection from the second flip-flop element to the first flip-flop tends to bias the first flip-flop element to the operating condition different from the operating condition of the second flip-flop element.

A first switching means is connected to the first flip-flop element and when in a switching condition switches the first flip-flop element to the first operating condition and biases the second flip-flop element to the second operating condition. A second switching means is also connected to the first flip-flop element and when in a switching condition switches the first flip-flop element to the second operating condition thereby biasing the second flip-flop element to the first operating condition.

A first input means is connected to a clock input terminal, to a data input terminal, and to the first switching means. The first input means biases the first switching means to the switching condition during the presence of signals at both the clock and data input terminals. A second input means is also connected to the clock input terminal and to the data input terminal, and is connected to the second switching means. The second input means biases the second switching means to the switching condition during the presence of a signal at the clock input terminal while there is no data signal present at the data input terminal.

As a feature of the circuit according to the invention each flip-flop element includes a flip-flop transistor, and the first flip-flop element also includes a flip-flop output transistor which is connected to the first flip-flop transistor so as to be biased to a substantially non-conducting condition when the first flip-flop transistor is in a low or substantially non-conducting condition and so as to be biased to a high conduction condition when the first flip-flop transistor is in a high conduction condition. The first switching means is connected to the flip-flop output transistor and to the first feedback connection. When it is in the switching condition, the first switching means switches the flip-flop output transistor to a high conduction condition and biases the second flip-flop transistor to a substantially nonconducting condition thereby causing the first flip-flop transistor to be biased to a high conduction condition. The second switching means is connected to the first flip-flop transistor, and when in the switching condition switches the first flip-flop transistor to a low conduction condition thereby switching the flip-flop output transistor to a substantially nonconducting condition and causing the second flip-flop transistor to be biased to a high conduction condition.

Additional objects, features, and advantages of the bistable circuit according to the invention will be apparent from the following detailed discussion and the single figure of the drawing which is a schematic circuit diagram of a delay type flip-flop circuit according to the invention.

The bistable circuit as illustrated in the drawing includes a clock input terminal 10 and a data input terminal 11. The two input terminals are each connected directly to separate emitters of a dual-emitter NPN first input transistor $Q_4$. The base of input transistor $Q_4$ is connected through a resistance $R_4$ to a source of positive voltage labeled B+, and its collector is connected directly to the base of an NPN first switching transistor $Q_5$.

The clock input terminal 10 is also connected directly to the emitter (cathode) of an NPN transistor device $Q_1$ employing the base-emitter junction as a diode junction. The base (anode) of transistor $Q_1$ is connected through a resistance $R_1$ to the voltage source B+ and directly to the base of an NPN second input transistor $Q_2$. The collector of input transistor $Q_2$ is connected directly to the voltage source B+ and the emitter is connected through resistances $R_2$ and $R_3$ in series to ground. The connection between the two series connected resistances is connected directly to the base of an NPN second switching transistor $Q_3$. The data input terminal 11 is connected directly to the emitter of the second switching transistor $Q_3$.

The first flip-flop element of the circuit includes an NPN first flip-flop transistor $Q_6$ and an NPN flip-flop output transistor $Q_7$. The collector of the first flip-flop transistor $Q_6$ is connected directly to the collector of the first switching transistor $Q_5$ and through a resistance $R_6$ to the voltage source B+. The emitter of the first flip-flop transistor $Q_6$ is connected directly to the base of the flip-flop output transistor $Q_7$, directly to the emitter of the first switching transistor $Q_5$, and through a resistance $R_7$ to ground. The base of the first flip-flop transistor $Q_6$ is connected directly to the collector of the second switching transistor $Q_3$ and through resistance $R_5$ to the voltage source B+. The collector of the flip-flop output transistor $Q_7$ is connected through a resistance $R_8$ to the voltage source B+ and its emitter is connected directly to ground.

The second flip-flop element of the circuit includes an NPN second flip-flop transistor $Q_8$ having its base connected directly to the collector of the first flip-flop transistor $Q_6$, thus providing a first feedback connection from the first flip-flop transistor $Q_6$ to the second flip-flop transistor $Q_8$. The collector of the second flip-flop transistor $Q_8$ is connected directly to the base of the first flip-flop transistor $Q_6$, thus providing a second feedback connection from the second flip-flop transistor $Q_8$ to the first flip-flop transistor $Q_6$. The emitter of the second flip-flop transistor is connected through a diode $D_1$ to ground.

The flip-flop output transistor $Q_7$ is connected to an output section 12 by a direct connection between its collector and the base of an NPN input transistor $Q_9$ of the output section. The collector of the input transistor $Q_9$ is connected through a resistance $R_9$ to the voltage source B+, and its emitter is connected through a resistance $R_{10}$ to ground. Its emitter is also connected directly to the base of an NPN output transistor $Q_{10}$ having its collector connected directly to the output terminal 13 and its emitter connected directly to ground. The collector of the input transistor $Q_9$ is also connected through a diode $D_2$ to the base of an NPN voltage setting transistor $Q_{11}$. The collector of voltage setting transistor $Q_{11}$ is connected through resistance $R_{11}$ to the voltage source B+ and its emitter is connected directly to the output terminal 13.

When a low voltage level condition of no signal is present at both the clock and data input terminals 10 and 11, current flows from the voltage source B+ through the base resistance $R_4$ and across the forward biased base-emitter junctions of transistor $Q_4$. The greatest voltage drop takes place across the resistance $R_4$ establishing a low voltage level at the base transistor $Q_4$. Under these conditions although transistor $Q_4$ is operating in saturation the voltage at the collector is low and current does not flow from the collector into the base of the first switching transistor $Q_5$ and transistor $Q_5$ is substantially non-conducting. Therefore, the first switching transistor $Q_5$ is in a high impedance condition and does not affect the operating conditions of the flip-flop elements.

Current similarly flows from voltage source B+ through resistance $R_1$ and the forward biased junction of transistor $Q_1$. The greatest voltage drop occurs across the resistance $R_1$ producing a low voltage at the collector of $Q_1$ and at the base of transistor $Q_2$. The second input transistor $Q_2$ is thus biased to a very low conduction condition producing a voltage level near ground at the base of the second switching transistor $Q_3$. Transistor $Q_3$ is therefore biased to a substantially nonconducting condition, and since essentially no current flows in its collector circuit, this transistor also does not affect the operating conditions of the flip-flop elements.

When a positive information input signal is applied at the data input terminal 11 while no signal is being applied at the clock input terminal 10, there is no change in the operating conditions of the first input transistor $Q_4$ or in transistor $Q_1$. Current will continue to flow through the forward biased base-emitter junction of the input transistor $Q_4$ to the clock input terminal 10, thus holding transistor $Q_5$ in a substantially non-conducting condition. Since the second input transistor $Q_2$ is in a very low conduction condition, the voltage at the base of the second switching transistor $Q_3$ remains low biasing transistor $Q_3$ to a substantially nonconducting condition. Thus, the presence of a positive information signal at the data input terminal 11 has no effect on either of the switching transistors $Q_5$ or $Q_3$, and the flip-flop elements are not affected regardless of their operating conditions.

The information data being applied at the data input terminal 11 is not entered in the circuit until a positive clock pulse signal is applied at the clock input terminal 10. When the clock input terminal 10 and the data input terminal 11 are both at sufficiently high voltage levels, the base-emitter junction of the first input transistor $Q_4$ becomes reverse biased reducing current flow through resistance $R_4$. Thus, the voltage at the base of the first input transistor $Q_4$ increases biasing the transistor to conduction and causing current to flow into the base of the first switching transistor $Q_5$. Current flows across the base-emitter junction of the first switching transistor $Q_5$ to the base of the flip-flop output transistor $Q_7$ switching that transistor as well as the switching transistor $Q_5$ to a high conduction condition.

Current flow in the collector circuit of the first switching transistor $Q_5$ lowers the voltage at the collector of that transistor and also at the base of the second flip-flop transistor $Q_8$. Conduction in the second flip-flop transistor $Q_8$, assuming that transistor has been conducting heavily, is reduced causing the voltage at its collector and at the base of the first flip-flop transistor $Q_6$ to rise. The first flip-flop transistor $Q_6$ is biased to a high conduction condition. Current flow in its collector circuit holds the voltage at its collector low tending to maintain the second flip-flop transistor $Q_8$ substantially nonconducting. Current flow in the emitter circuit of transistor $Q_6$ provides continued base drive to the flip-flop output transistor $Q_7$. Thus, the first flip-flop transistor $Q_6$ and the flip-flop output transistor $Q_7$ are both in high conduction conditions while the second flip-flop transistor $Q_8$ is in a substantially non-conducting condition. By virtue of the feedback connection from the collector of the first flip-flop transistor Q6 to the base of the second flip-flop transistor $Q_8$ these operating conditions are maintained after transistor $Q_5$ returns to the substantially nonconducting condition.

During the occurrence of positive signals at both clock pulse input terminal 10 and the data input terminal 11, the voltage at the base of transistor $Q_1$ and at the base of transistor $Q_2$ increases as current through resistance $R_1$ and across the base-emitter junction of transistor $Q_1$ decreases. The second input transistor $Q_2$ is biased to a high conduction condition, and current flow through the series connected resistances $R_2$ and $R_3$ in its emitter circuit increases the voltage at the base of the second switching transistor $Q_3$. Although the emitter of the second switching transistor $Q_3$ is at the high voltage level, a small amount of current flows through the base-collector junction of transistor $Q_3$ into the base of the first flip-flop transistor $Q_6$. This action increases the speed at which transistor $Q_6$ becomes conducting.

Upon termination of the clock pulse, the flip-flop elements remain in their switched conditions. The information signal at the data input terminal 11 alone having no effect on the operating conditions of the circuit as explained previously.

When the data input terminal 11 is at the low voltage level condition indicating no signal and a positive clock pulse is applied at the clock input terminal 10, heavy current flows across the forward biased base-emitter junction of the first input transistor $Q_4$ to the data input terminal 11 biasing the first switching transistor $Q_5$ to the nonconduction condition. The positive clock pulse causes the transistor $Q_2$ to conduct heavily producing a positive voltage at the base of the second switching transistor $Q_3$. Since the emitter of the transistor $Q_3$ is at a low voltage level, the transistor is biased to a high conduction condition.

Heavy current flows in the collector circuit of the second switching transistor $Q_3$ across resistance $R_5$ producing a low voltage at the base of the first flip-flop transistor $Q_6$. Transistor $Q_6$ is switched to a substantially nonconducting condition. Since substantially no current flows in the emitter circuit of transistor $Q_6$, no base current is available to the flip-flop output transistor $Q_7$ and the emitter of transistor $Q_6$ and base of transistor $Q_7$ are near ground potential. Transistor $Q_7$ is thus switched to a substantially nonconducting condition.

As current flow in the collector circuit of the first flip-flop transistor $Q_6$ is reduced, the voltage at its collector and at the base of the second flip-flop transistor $Q_8$ is increased. The second flip-flop transistor $Q_8$ is thus biased to conduction. However, by virtue of the very heavy current flow across resistance $R_5$ into the collector of the second switching transistor $Q_3$, little current flows into the collector of transistor $Q_8$ until after the clock pulse signal terminates and conduction in the collector circuit of transistor $Q_3$ stops. When the clock pulse terminates, heavy current flows in the collector circuit of transistor $Q_8$ and the feedback connection to transistor $Q_6$ holds transistor $Q_6$ in a substantially nonconducting condition.

The output section 12 provides a signal at the output terminal 13 indicative of the operating state of the flip-flop while serving as a buffer isolating the flop-flop elements from the load connected to the output terminal. When the flip-flop output transistor $Q_7$ is in the substantially nonconducting condition, the voltage at its collector is relatively high and the input transistor $Q_9$ of the output section is biased to conduction. Current flow through the input transistor $Q_9$ and the series connected resistances $R_9$ and $R_{10}$ produces a relatively low voltage at the collector and a relatively high voltage at the emitter. Thus, the output transistor $Q_{10}$ is biased to a high conduction condition providing a low impedance path between the output terminal 13 and ground and establishing a low voltage level at the output terminal. The relatively low voltage at the base of the voltage setting transistor $Q_{11}$ maintains that transistor in a substantially nonconducting condition.

When the flip-flop output transistor $Q_7$ is switched to the high conduction condition, a relatively low potential is established at the base of input transistor $Q_9$. As conduction through the input transistor $Q_9$ and the series connected resistances $R_9$ and $R_{10}$ decreases, the voltage at the collector increases and that at the emitter decreases. The reduced voltage at the emitter of input transistor $Q_9$ biases the base of the output transistor $Q_{10}$ so as to render that transistor substantially nonconducting. The output transistor $Q_{10}$ thus presents a high impedance between the output terminal 13 and ground.

The increased voltage at the base of the voltage setting transistor $Q_{11}$ together with the low voltage present at its emitter biases the voltage setting transistor $Q_{11}$ to a conducting condition. This transistor conducts heavily to drive the load on the output until the voltage at the output terminal 13 reaches a predetermined high level established by the voltage of the B+ voltage source less the leakage current voltage drop across the resistance $R_9$, the diode $D_2$, and the base-emitter junction of the voltage setting transistor $Q_{11}$. Restoration of the voltage at the output terminal to this higher level biases the voltage setting transistor $Q_{11}$ to a substantially nonconducting condition.

In summary, a clock pulse causes the operating state of the flip-flop circuit to be set in accordance with the information present at the data input. When a positive information signal is present at the data input terminal 11, a clock pulse causes the flip-flop output transistor $Q_7$ to be switched to, or remain in, a high conduction condition producing a high voltage level signal at the output terminal 13. During a no signal condition at the data input terminal 11, a clock pulse causes the flip-flop output transistor $Q_7$ to be switched to, or remain in, a substantially nonconducting condition producing a low voltage level signal at the output terminal 13. In the periods between clock pulses the operating state of the flip-flop circuit does not change regardless of changes in the signal present at the data input terminal.

The delay flip-flop circuit according to the invention is relatively simple and uncomplicated. Because of the simplicity of the circuit, several may be formed in one chip of semiconductor material to provide a multiple-bit binary register, thereby greatly reducing the size of registers employed in temporary storage memories and other register subsystems. Power dissipation is less than that in an arrangement of compatible logic blocks connected so as to provide the same logic operation.

The circuit provides high speed switching. The flip-flop output transistor $Q_7$ is switched directly by the switching transistors from each operating condition to the other without the necessity of waiting for the operation of the flip-flop transistors to be stabilized by means of the feedback connections. Thus, there is no propagation delay through the flip-flop elements before the proper signal condition can be presented at the output terminal.

Although the circuit as shown employs a particular output section 12 having advantages in isolating the load at the output terminal 13 from the flip-flop output transistor $Q_7$ so as not to affect the switching speed of the flip-flop output transistor, other output arrangements are possible. For example, the output from the flip-flop output transistor may be connected to the output terminal through an enable gate so that the signal indicative of the operating state of the flip-flop circuit is not presented at the output terminal until an enabling pulse is applied. In another arrangement the outputs from several flip-flop output transistors may be connected to a single output terminal through an OR gate.

While there has been shown and described what is considered a preferred embodiment of the present invention, it will be obvious to those skilled in the art that various changes and modifications may be made therein without departing from the invention as defined in the appended claims.

What is claimed is:

1. A bistable circuit including in combination a first flip-flop element having a first operating condition and a second operating condition, a second flip-flop element having a first operating condition and a second operating condition, a first feedback connection from the first flip-flop element to the second flip-flop element operable to bias the second flip-flop element to the second operating condition when the first flip-flop element is in the first operating condition and operable to bias the second flip-flop element to the first operating condition when the first flip-flop element is in the second operating condition, a second feedback connection from the second flip-flop element to the first flip-flop element operable to bias the first flip-flop element to the second operating condition when the second flip-flop element is in the first operating condition and operable to bias the first flip-flop element to the first operating condition when the second flip-flop element is in the second operating condition, first switching means connected to said first flip-flop element and to the first feedback connection and operable when in a switching condition to switch the first flip-flop element to the first operating condition and bias the second flip-flop element to the second operating condition, second switching means connected to said first flip-flop element and operable when in a switching condition to switch the first flip-flop element to the second operating condition thereby biasing the second flip-flop element to the first operating condition, a first input terminal, a second input terminal, first input means connected to the first input terminal, the second input terminal, and the first switching means and operable to bias the first switching means to the switching condition during the presence of signals at the first and second input terminals, and second input means connected to the first input terminal, the second input terminal, and the second switching means and operable to bias the second switching means to the switching condition during the presence of a signal at the first input terminal while a signal is not present at the second input terminal.

2. A bistable circuit according to claim 1 wherein said first flip-flop element includes a first flip-flop transistor, said second flip-flop element includes a second flip-flop transistor, said first feedback connection includes a connection from the collector of the first flip-flop transistor to the base of the second flip-flop transistor operable to bias the second flip-flop transistor to a substantially nonconducting condition when the first flip-flop transistor is in a high conduction condition and operable to bias the second flip-flop transistor to a high conduction condition when the first flip-flop transistor is in a substantially nonconducting condition, said second feedback connection includes a connection from the collector of the second flip-flop transistor to the base of the first flip-flop transistor operable to bias the first flip-flop transistor to a substantially nonconducting condition when the second flip-flop transistor is in a high conduction condition and operable to bias the first flip-flop transistor to a high conduction condition when the second flip-flop transistor is in a substantially nonconducting condition, said first switching means includes a first switching transistor having its collector connected to the collector of the first flip-flop transistor and to the first feedback connection and its emitter connected to the emitter of the first flip-flop transistor, said first feedback connection being operable to bias the second flip-flop transistor to a substantially nonconducting condition when the first switching transistor is in a high conduction condition whereby the second feedback connection biases the first flip-flop transistor to a high conduction condition, said second switching means includes a second switching transistor having its collector connected to the base of the first flip-flop transistor and to the second feedback connection and operable when in a high conduction condition to switch the first flip-flop transistor to a substantially nonconducting condition whereby the first feedback connection biases the second flip-flop transistor to a high conduction condition, said first input means is connected to the base of the first switching transistor and is operable to bias the first switching transistor to a high conduction condition during the presence of signals at the first and second input terminals, and said second input means is connected to the emitter and to the base of the second switching transistor and is operable to bias the second switching transistor to a high conduction condition during the presence of a signal at the first input terminal while a signal is not present at the second input terminal.

3. A bistable circuit according to claim 2 wherein said first input means includes a dual-emitter first input transistor having one emitter connected to the first input terminal, the other emitter connected to the second input terminal, and the collector connected to the base of the first switching transistor, and said second input means includes a connection from the second input terminal to the emitter of the second switching transistor, and means connecting the first input terminal to the base of the second switching transistor.

4. A bistable circuit according to claim 3 wherein the collector of the first flip-flop transistor, the collector of the first switching transistor, and the base of the second flip-flop transistor are connected directly to each other and through a resistance to one source of reference potential, the collector of the second flip-flop transistor, the collector of the second switching transistor, and the base of the first flip-flop transistor are connected directly to each other and through a resistance to the one source of reference potential, the emitters of the first flip-flop transistor, the second flip-flop transistor, and the first switching transistor are connected to another source of reference potential, and said means connecting the first input terminal to the base of the second switching transistor includes a second input transistor having its collector connected to the one source of reference potential and its emitter connected through two resistances in series to the other source of reference potential, the base of the second switching transistor being connected directly to the connection between the two resistances, in series, and means connecting the first input terminal to the base of the second input transistor and operable to bias the second input transistor to a high conduction condition during the presence of a signal at the first input terminal.

5. A bistable circuit according to claim 4 wherein said first flip-flop element includes a flip-flop output transistor having its collector connected through a resistance to the one source of reference potential, its emitter connected to the other source of reference potenial, and its base connected directly to the emitter of the first flip-flop transistor, said flip-flop output transistor being biased to a substantially nonconducting condition when the first flip-flop transistor is in a substantially nonconducting condition thereby producing a first signal condition at the collector of the flip-flop output transistor, and said flip-flop output transistor being biased to a high conduction condition when the first flip-flop transistor is in a high conduction condition thereby producing a second signal condition at the collector of the flip-flop output transistor.

6. A bistable circuit including in combination a first flip-flop element including a first flip-flop transistor, a flip-flop output transistor, and means connecting the first flip-flop transistor to the flip-flop output transistor operable to bias the flip-flop output transistor to a substantially nonconducting condition when the first flip-flop transistor is in a substantially nonconducting condition and operable to bias the flip-flop output transistor to a high conduction condition when the first flip-flop transistor is in a high conduction condition, a second flip-flop element including a second flip-flop transistor, a first feedback connection from the first flip-flop transistor to the second flip-flop transistor operable to bias the second flip-flop transistor to a substantially nonconducting condition when the first flip-flop transistor is in a high conduction condition and operable to bias the second flip-flop transistor to a high conduction condition when the first flip-flop transistor is in a substantially non-conducting condition, a second feedback connection from the second flip-flop transistor to the first flip-flop transistor operable to bias the first flip-flop transistor to a substantially nonconducting condition when the second flip-flop transistor is in a high conduction condition and operable to bias the first flip-flop transistor to a high conduction condition when the second flip-flop transistor is in a substantially nonconducting condition, a first switching means connected to the flip-flop output transistor and to the first feedback connection and operable when in a switching condition to switch the flip-flop output transistor to a high conduction condition and bias the second flip-flop transistor to a substantially nonconducting condition causing the first flip-flop transistor to be biased to a high conduction condition, and a second switching means connected to the first flip-flop transistor and operable when in a switching condition to switch the first flip-flop transistor to a substantially nonconducting condition thereby switching the flip-flop output transistor to a substantially nonconducting condition and causing the second flip-flop transistor to be biased to a high conduction condition.

7. A bistable circuit according to claim 6 wherein the emitter of the first flip-flop transistor is connected to the base of the flip-flop output transistor, said first feedback connection includes a connection from the collector of the first flip-flop transistor to the base of the second flip-flop transistor, said second feedback connection includes a connection from the collector of the second flip-flop transistor to the base of the first flip-flop transistor, said first switching means includes a first switching transistor having its collector connected to the collector of the first flip-flop transistor and the first feedback connection and its emitter connected to the emitter of the first flip-flop transistor and the base of the flip-flop output transistor and operable when in a high conduction condition to switch the flip-flop output transistor to a high conduction condition and bias the second flip-flop transistor to a substantially nonconducting condition causing the first flip-flop transistor to be biased to a high conduction condition, and said second switching means includes a second switching transistor having its collector connected to the base of the first flip-flop transistor and the second feedback connection and operable when in a high conduction condition to switch the first flip-flop transistor to a substantially nonconducting condition thereby switching the flip-flop output transistor to a substantially nonconducting condition and causing the second flip-flop transistor to be biased to a high conduction condition.

References Cited

UNITED STATES PATENTS

| | | | |
|---|---|---|---|
| 3,229,119 | 1/1966 | Bohn et al. | 307—299 |
| 3,283,170 | 11/1966 | Buie. | |
| 3,309,529 | 3/1967 | Bates et al. | 307—292 |
| 3,345,518 | 10/1967 | Thompson | 307—299 |
| 3,384,766 | 5/1968 | Kardash | 307—292 |

OTHER REFERENCES

Sylvania Universal High-Level Logic (Feb. 5, 1965).

DONALD D. FORRER, Primary Examiner

J. D. FREW, Assistant Examiner

U.S. Cl. X.R.

307—247, 292